United States Patent
Lee

(10) Patent No.: US 7,663,431 B2
(45) Date of Patent: Feb. 16, 2010

(54) TUNER AND DEMODULATING UNIT THEREOF

(75) Inventor: Hye-Ryung Lee, Gwangju-si (KR)

(73) Assignee: LG Innotek Co., Ltd., Seoul (KR)

( * ) Notice: Subject to any disclaimer, the term of this patent is extended or adjusted under 35 U.S.C. 154(b) by 502 days.

(21) Appl. No.: 10/572,552

(22) PCT Filed: Mar. 22, 2005

(86) PCT No.: PCT/KR2005/000833

§ 371 (c)(1),
(2), (4) Date: Mar. 17, 2006

(87) PCT Pub. No.: WO2006/001584

PCT Pub. Date: Jan. 5, 2006

(65) Prior Publication Data

US 2008/0231355 A1 Sep. 25, 2008

(30) Foreign Application Priority Data

Mar. 22, 2004 (KR) .................... 10-2004-0019237

(51) Int. Cl.
*H03D 3/00* (2006.01)

(52) U.S. Cl. .................. 329/320; 329/323; 348/727; 348/736

(58) Field of Classification Search ................ 348/727, 348/736, 737; 329/318, 320, 323
See application file for complete search history.

(56) References Cited

U.S. PATENT DOCUMENTS

| 5,337,091 A | * | 8/1994 | Harford et al. ............. 348/737 |
| 6,031,878 A | | 2/2000 | Tomasz et al. |
| 6,667,760 B1 | | 12/2003 | Limberg |

FOREIGN PATENT DOCUMENTS

| JP | 7-30829 A | 1/1995 |
| KR | 1993-0011595 B1 | 12/1993 |
| KR | 1999-013325 U | 4/1999 |

OTHER PUBLICATIONS

English language abstract of KR-20-0137021 (Apr. 1, 1999).

* cited by examiner

*Primary Examiner*—Robert Pascal
*Assistant Examiner*—James E Goodley
(74) *Attorney, Agent, or Firm*—Birch, Stewart, Kolasch & Birch, LLP

(57) ABSTRACT

A tuner and a demodulating unit thereof are provided. A trap filter for a specific frequency is installed in the IF demodulating unit so as to eliminate a frequency signal acting as a beat component.

17 Claims, 2 Drawing Sheets

TUNER AND DEMODULATING UNIT THEREOF

TECHNICAL FIELD

The present invention relates to an intermediate frequency demodulating unit of a tuner, and more particularly, to a demodulating unit of a television tuner including a rejection circuit for effectively eliminating a frequency signal that acts as a beat component when a television image signal is demodulated.

BACKGROUND ART

In general, a tuner receives a radio frequency (RF) signal through an antenna, converts the RF signal into an intermediate frequency (IF) signal, detects the IF signal, separates the detected IF signal into a video signal and a sound signal, and outputs each signal. There is an advantage of improving frequency selectivity, reducing sensitivity for peripheral circuits and enhancing stability by additionally performing the IF conversion process during an operation of the tuner.

A structure of a general tuner will be briefly described below. The general tuner includes an antenna, a mixer, and a local oscillator. A TV broadcasting system divides its wide RX frequency band (50-900 MHz) into a VHF band and a UHF band and uses two corresponding band blocks (that is, VHF/UHF band blocks) because its tuner uses a variable capacitance diode having a limited capacitance ratio. The VHF/UHF band blocks each include an input unit, an amplifier unit, and a tuning unit.

An operation of the tuner will be briefly described below. In the tuner, the antenna receives RF signals and transmits the RF signals to the band block. In the band block, the input unit selects and outputs only a desired band RF signal among the RF signals from the antenna, the amplifier unit amplifies the desired band RF signal from the input unit, and the tuning unit tunes and outputs the RF signal received from the amplifier unit.

The mixer mixes the RF signal received from each band block with an oscillation frequency signal to output an IF signal. The oscillation frequency is received from the local oscillator.

Various types can be applied to the TV broadcasting system. The present invention mainly relates to an NTSC TV broadcasting system but is not limited to the NTSC TV broadcasting system.

In the general tuner, a TV video signal is influenced by an FM radio signal when the US channel 6 is selected. In more detail, the US channel 6 has a video frequency of 86.83 MHz and a sound frequency of 87.75 MHz. An FM radio frequency signal of 88.1-88.5 MHz most affects the US channel 6. The FM radio frequency signal of 88.1-88.5 MHz adds a noise signal to a noise signal of the US channel 6 because it is adjacent to a frequency band of the US channel 6.

In the general tuner, a trap filter is connected to a tuning unit of the VHF band block so as to eliminate the FM radio frequency signal of 88.1-88.5 MHz and. When the US channel 6 is selected, the trap filter operates according to a control signal of a microcomputer or an external switching signal so as for the tuning unit to directly eliminate the FM radio frequency signal of 88.1-88.5 MHz. Accordingly, the trap filter directly eliminates the FM radio frequency signal of a high frequency band, and the mixer converts the resulting signal into an IF signal.

However, when the FM radio frequency signal of a high frequency band is eliminated, the video and sound frequency signals of the US channel 6 adjacent to the FM radio frequency signal is undesirably weakened. In more detail, when the US channel 6 is selected, the trap filter eliminates the FM radio frequency signal of 88.1-88.5 MHz. At this time, the video frequency signal of 86.83 MHz and the sound frequency signal of 87.75 MHz in the US channel 6 adjacent to a trap frequency are also eliminated, and thus the video and sound quality is deteriorated.

DISCLOSURE

Technical Problem

Accordingly, the present invention is directed to a tuner and a demodulating unit thereof that substantially obviates one or more of the problems due to limitations and disadvantages of the related art.

An object of the present invention is to provide a tuner and a demodulating unit thereof for preventing the deterioration of the video and sound quality by effectively eliminating a beat component generated due to a FM radio signal when the US channel 6 is selected.

Another object of the present invention is to provide a tuner and a demodulating unit thereof for preventing the deterioration of the video and sound quality in a selected channel by eliminating noise in a video baseband.

Technical Solution

To achieve these and other advantages and in accordance with the purpose of the present invention, as embodied and broadly described, a tuner includes: an RF (radio frequency) processing unit; an IF (intermediate frequency) demodulating unit for demodulating intermediate frequency outputted from the RF processing unit; and a trap filter disposed at a baseband signal line of the IF demodulating unit to eliminate noise of a baseband signal.

According to another aspect of the present invention, there is provided a demodulating unit of a tuner, including: a filter; a sound signal processing line diverging from the filter to process a sound signal; a video signal processing line diverging from the filter to process a video signal; and a trap filter disposed at the video signal processing line to a beat component.

According to a further another aspect of the present invention, there is provided a demodulating unit of a tuner, including: a sound signal processing line; a video signal processing line; and a trap filter disposed at the video signal process line to eliminate a beat component generated due to a FM radio frequency.

Advantageous Effects

According to the present invention, the video and sound quality in a selected channel improves and especially in the US channel 6.

Moreover, there is advantage of preventing the deterioration of the video and sound quality in a TV by effectively eliminating a frequency band signal acting as noise in a video baseband.

Furthermore, there is advantage of improving noise elimination efficiency in a selected channel by eliminating an FM radio frequency band signal and other adjacent channel frequency band signals in a video baseband.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Hereinafter, preferred embodiments of the present invention will be described in detail with reference to accompanying drawings.

Figure 1:
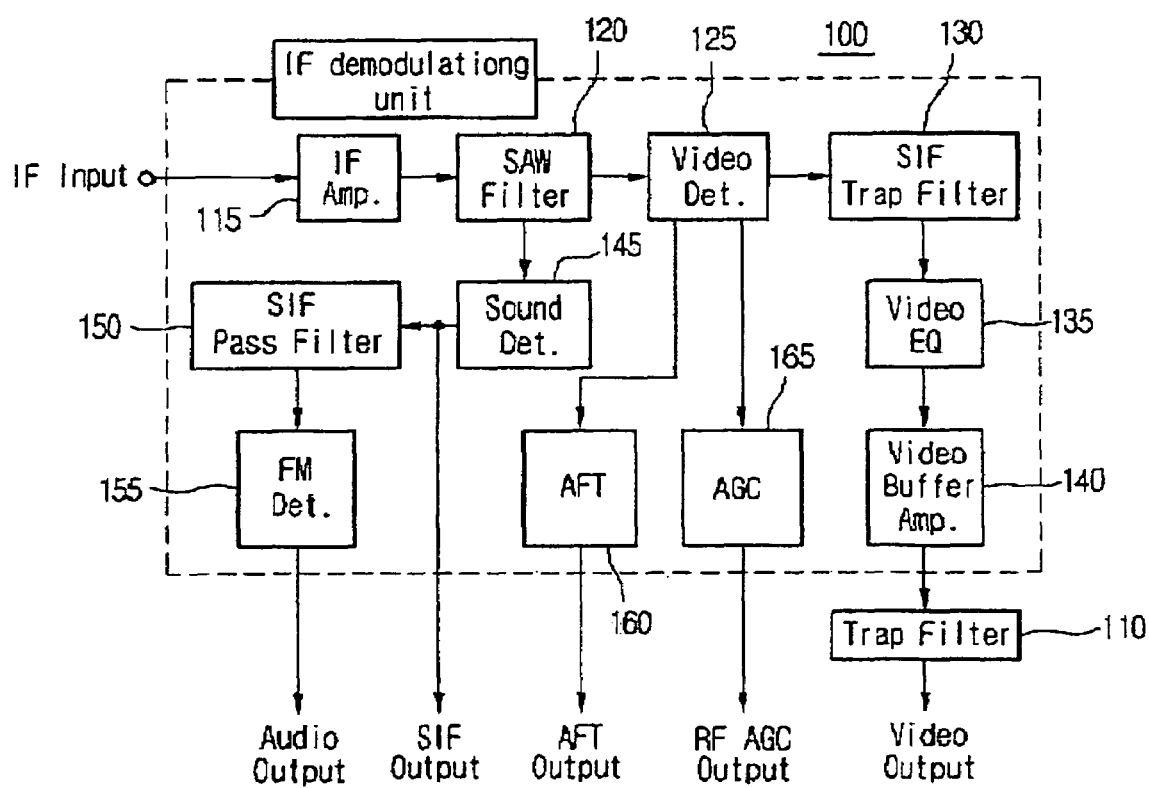
FIG. 1 is a block diagram illustrating a demodulating unit of a tuner according to a first embodiment of the present invention.

FIG. 1 is a block diagram illustrating a demodulating unit of a tuner according to a first embodiment of the invention.

Referring to FIG. 1, a tuner includes an RF processing unit (not shown) for converting an RF signal into an IF signal, and an IF demodulating unit 100 for demodulating the IF signal. The signals demodulated by the IF demodulating unit are provided to respective elements of a TV to allow the television to operate.

The IF demodulating unit 100 includes a surface acoustic wave (SAW) filter 120 for selecting only a signal of a specific frequency band among IF signals received from the high frequency process unit, and an IF amplifier 115 for amplifying the selected IF signal.

Signals divided by the SAW filter are inputted to a sound detector 145 and a video detector 125 respectively. By this configuration, IF sound and video signals are demodulated while passing through a sound signal processing line and a video signal processing line respectively.

A sound intermediate frequency (SIF) signal detected by the sound detector 145 is directly outputted outside and used as a control signal. Only a sound signal of the SIF signal passes through an SIF pass filter 150, and then the sound signal passes though a frequency modulation detector 155 and is outputted as an audio signal.

An output signal of the video detector 125 is outputted to an automatic frequency tuner (AFT) and compensated for the degree of input frequency distortion indicated with DC voltage. An automatic gain controller (AGC) 165 controls an amplification gain value of a tuner by using the output signal received from the video detector 125. Also, an SIF trap filter 130 eliminates a sound signal form the output signal of the video detector 125 to thereby output a video signal only. A video equalizer 135 adjusts the outputted video signal for respective frequencies. A trap filter 110 eliminates noise of a specific frequency from the output video signal of the video equalizer 135 and outputs the noise-eliminated video signal to the outside of the IF demodulating unit. A video buffer amplifier 140, for protecting a video output circuit from external impacts such as surge may be added between the video equalizer 135 and the trap filter 110.

The present invention is characterized in that the trap filter 110 is added to the IF demodulating unit 100. In more detail, the trap filter 110 is provided to a video baseband signal processing line. The trap filter 110 aims at eliminating a signal of a specific frequency. A band-pass filter for eliminating an FM radio signal of the 4.85-5.25 MHz band may be used as the trap filter 110.

A method of selecting a frequency band eliminated by the trap filter 110 will now be described in detail.

As described above, when the US channel 6 having a video frequency of 86.83 MHz and a sound frequency of 87.75 MHz is selected in the NTSC broadcasting system in US, a noise of 88.1-88.5 MHz due to the FM radio signal causes the degradation of video and audio signals. The trap filter 110 is used to eliminate the noise of 88.1-88.5 MHz from a video baseband signal.

In more detail, a beat frequency of the video baseband signal generated due to the FM radio signal is the following.

<NTSC System>

FM 201 channel (88.1 MHz) inputs,

Fosc (6 channel)−88.1 MHz=129 MHz−88.1 MHz=40.9 MHz

FIF−40.9 MHz=45.75 MHz−40.9 MHz=4.85 MHz

FM 203 channel (88.5 MHz) inputs,

Fosc (6 channel)−88.5 MHz=129 MHz−88.5 MHz=40.5 MHz

FIF−40.5 MHz=45.75 MHz−40.5 MHz=5.25 MHz

Here, a local oscillation frequency Fosc is 129 MHz and an intermediate frequency FIF is 45.75 MHz in the US channel 6 of the NTSC broadcasting system.

From the calculation result, the beat component generated due to the FM radio frequency is effectively eliminated by inserting the trap filter 110 of 4.85-5.25 MHz into the video baseband signal processing line of the NTSC system. As a result, the elimination effect of an image noise caused by the FM radio frequency, i.e., a rejection ratio can be improved. When the FM radio signal is eliminated, a video baseband signal is not affected at all because the video baseband signal is a low frequency signal and has a relatively larger frequency difference with respect to a noise signal frequency.

Since the trap filter 110 can accurately eliminate only a beat component of a 4.85-5.25 MHz band from the video baseband signal, a color frequency of 3.58 MHz in the video baseband signal is not affected and the deterioration of an image due to a color change is prevented.

Since a sound signal processing line and circuit has a different path and circuit compared with a video signal process line, the sound signal and the video signal do not influence each other and the deterioration of sound quality is prevented. In more detail, since a sound baseband signal is transmitted through the SAW filter 120, the sound detector 145 and then the SIF pass filter 150 in the sound signal process line, the sound signal is not affected from the FM radio signal. That is, a separate trap filter for a sound signal is unnecessary because the SIF pass filter 150 passes only a sound signal.

Figure 2:
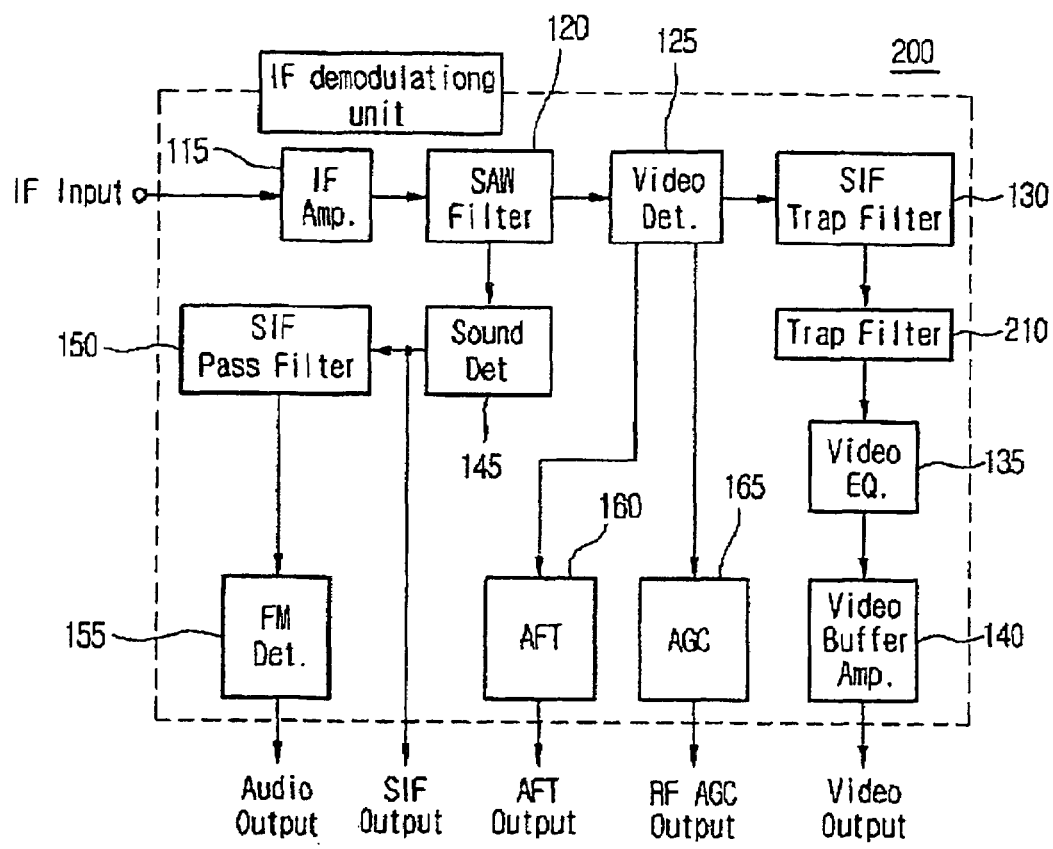
FIG. 2 is a block diagram illustrating a demodulating unit of a tuner according to a second embodiment of the present invention.

FIG. 2 is a block diagram illustrating a demodulating unit of a tuner according to a second embodiment of the invention.

The second embodiment is identical to the first embodiment with the exception of the installation location of a trap filter.

Referring to FIG. 2, a trap filter 210 for eliminating a FM radio signal is disposed between an SIF trap filter 130 and a video equalizer 135 to in a demodulating unit of a tuner 200.

In case of the second embodiment, it is predictable to have same effect like the first embodiment. Moreover, the trap filter can be conveniently installed in the demodulating unit when manufacturing the demodulating unit.

MODE FOR INVENTION

Another embodiment within an idea of the present invention will be described.

A trap filter is disposed at a video baseband signal line to eliminate a beat component of noise in the present invention. Since high frequencies are adjacent to each other but low frequencies are not, the noise in the baseband signal can be effectively eliminated and the noise elimination with a trap filter does not affect the baseband signal.

By using this property, a rejection ratio of an upper adjacent channel can be improved by inserting the trap filter correspondent to the bandwidth of each system into a video baseband signal process line.

For example, a bandwidth of 6 MHz in an NTSC system and 7 MHz in a PAL system is allocated to each channel. When the frequency of a corresponding bandwidth is removed by using the trap filter, the picture noise by the influence of an adjacent channel signal is eliminated.

A structure and operation of the tuner may be varied, and disposing the trap filter at the video signal process line and eliminating the noise signal of a specific frequency band are applicable regardless of the structure and operation of the tuner.

INDUSTRIAL APPLICABILITY

In the tuner and the demodulating unit thereof according to the present invention, noise can be removed without any problem in the video and sound quality since a beat component generated from a FM radio signal is accurately eliminated from a video baseband signal.

The noise can be selectively eliminated by removing noise in a baseband signal of low frequency and thus, a selected channel signal is not affected.

Especially, signals close to each other in a high frequency band act as noise. However, the signals do not affect an original signal during the elimination of noise because they get spaced apart from a selected signal in a baseband signal of low frequency. Accordingly, a receiving condition can be improved.

A tuner according to the present invention becomes cheaper because a noise signal can be eliminated by an inexpensive low frequency trap filter.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

The invention claimed is:

1. A tuner comprising:
    an RF (radio frequency) processing unit;
    an IF (intermediate frequency) demodulating unit configured to demodulate an intermediate frequency signal outputted from the RF processing unit; and
    a trap filter disposed at a video baseband signal line of the IF demodulating unit to eliminate noise of a video baseband signal,
    wherein the IF demodulating unit comprises,
        a video detector configured to output a video signal,
        a sound trap filter configured to eliminate a sound IF (intermediate frequency) signal from the video signal of the video detector and disposed between the video detector and the trap filter, and
        a first filter disposed at an input side of the video detector.

2. The tuner according to claim 1, wherein the trap filter eliminates a frequency signal of 4.85-5.25 MHz.

3. The tuner according to claim 2, wherein the baseband signal is a baseband signal of US channel 6 in an NTSC broadcasting system.

4. The tuner according to claim 1, wherein the IF demodulating unit further comprises an IF amplifier configured to amplify the IF signal, and wherein the first filter is configured to output a signal outputted from the IF amplifier to the video detector.

5. The tuner according to claim 1, wherein the IF demodulating unit further comprises:
    a video equalizer configured to adjust the outputted video signal from the sound trap filter; and
    a video buffer amplifier disposed between the video equalizer and the trap filter.

6. The tuner according to claim 1, wherein the trap filter is disposed at an output port of the intermediate frequency demodulating unit or an output port of the sound trap filter.

7. A demodulating unit of a tuner, the demodulating unit comprising:
    a first filter;
    a sound signal processing line diverging from the first filter to process a sound signal;
    a video signal processing line diverging from the first filter to process a video signal;
    a sound trap filter configured to eliminate a sound signal from an output video signal of the first filter and disposed at the video signal processing line;
    a trap filter disposed at an output side of a sound trap filter to eliminate a beat component;
    an IF amplifier disposed at an input side of the first filter; and
    a video detector disposed between the first filter and the sound trap filter.

8. The demodulating unit according to claim 7, wherein the trap filter eliminates a FM (frequency modulation) radio signal.

9. The demodulating unit according to claim 8, wherein the trap filter eliminates a frequency signal of 4.85-5.25 MHz.

10. The demodulating unit according to claim 9, wherein the trap filter eliminates a frequency signal of an upper adjacent channel of a selected channel.

11. The demodulating unit according to claim 7, further comprising:
    a video equalizer disposed at an output port of the trap filter; and
    a video buffer amplifier disposed at an output port of the video equalizer.

12. The demodulating unit according to claim 7, wherein the sound processing line includes a sound detector and a sound signal passing filter.

13. The demodulating unit according to claim 7, wherein the first filter is an SAW (surface acoustic wave) filter.

14. A demodulating unit of a tuner, the demodulating unit comprising:
    a sound signal processing line;
    a video signal processing line; and
    a trap filter disposed at the video signal process line to eliminate a beat component generated due to a FM (frequency modulation) radio frequency;
    a sound trap filter disposed at an input side of the trap filter; and
    a video detector disposed at an input side of the sound trap filter,
    wherein the trap filter eliminates a frequency signal of 4.85-5.25 MHz.

15. The demodulating unit according to claim 14, wherein the FM radio frequency is in a range of 88.1-88.5 MHz.

16. The demodulating unit according to claim 7, wherein the sound trap filter is a sound IF (intermediate frequency) trap filter.

17. The demodulating unit according to claim 14, wherein the sound trap filter is a sound IF (intermediate frequency) trap filter.

* * * * *